Sept. 7, 1943. J. P. NIELSEN 2,328,992
METHOD OF FABRICATING FIBROUS RESINOUS STRUCTURES
Filed Sept. 15, 1939
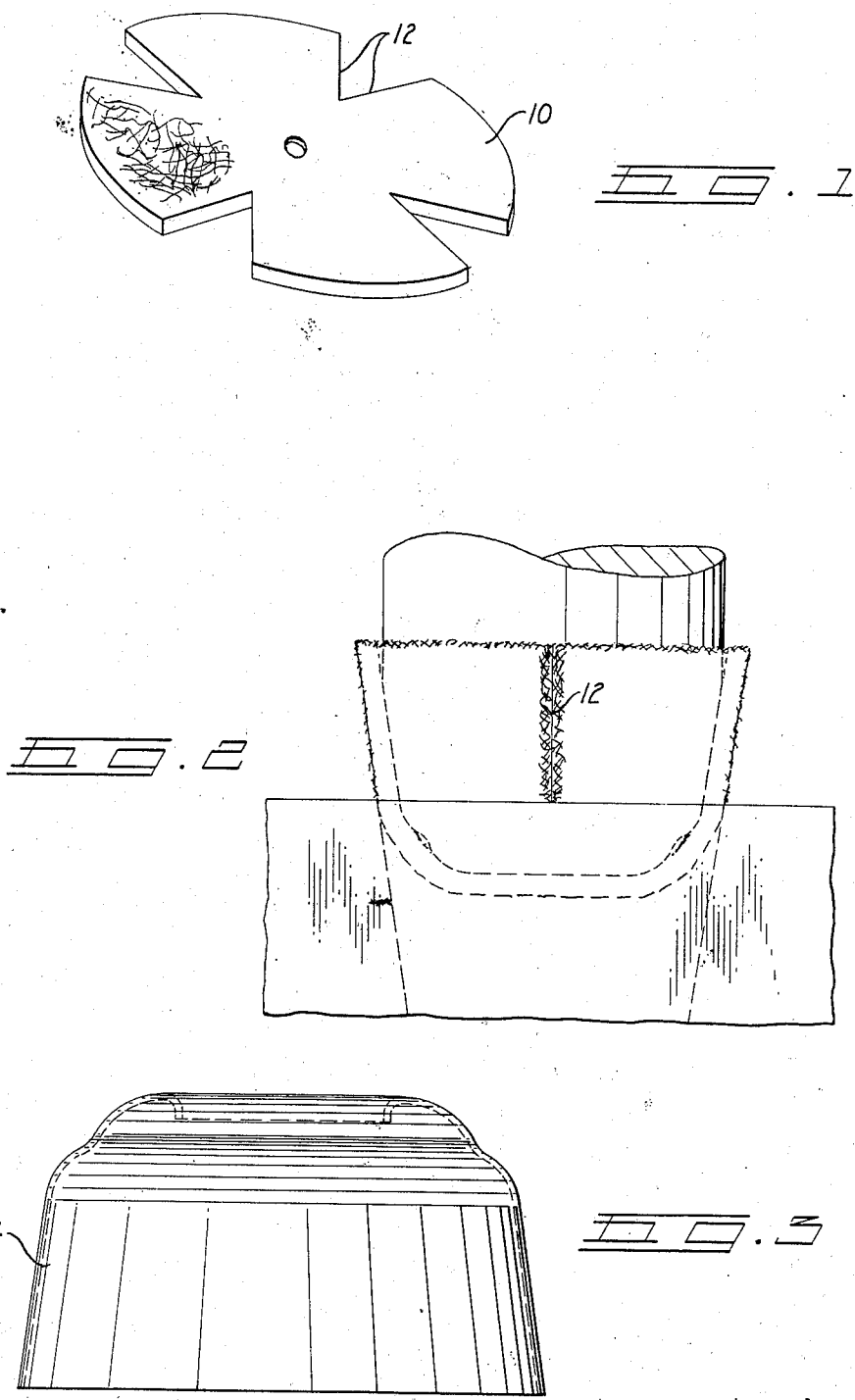
INVENTOR.
JOHN P. NIELSEN
BY
Parker + Burton
ATTORNEYS.

Patented Sept. 7, 1943

2,328,992

UNITED STATES PATENT OFFICE 2,328,992

METHOD OF FABRICATING FIBROUS RESINOUS STRUCTURES

John P. Nielsen, Detroit, Mich., assignor to Woodall Industries Incorporated, Detroit, Mich., a corporation of Michigan Application September 15, 1939, Serial No. 295,113

2 Claims. (Cl. 18—56)

This invention relates to improvements in the process of fabricating moldable fibrous resinous material and to an improved molded product resulting therefrom.

An object is to provide an improved molded fibrous resinous product and to improvements in the fabrication thereof whereby a strong, light weight, stiff yet flexible, and moisture resistant structural sheet or formed shape may be rapidly and inexpensively produced.

A further object is to produce such a structure which lends itself readily to shaping and deep drawing within the forming die and which may be completely formed with rapidity and which constitutes a unitary integral structure possessing uniform structural characteristics throughout.

Heretofore synthetic resins, such as the ureas and phenols wherein the formed articles consisted entirely of the condensation material, have been cast within a mold. The condensation material flowed readily as a liquid within the mold to cure to the desired shape. Analogous structures have been drawn within a die by mixing filler powder such as alpha cellulose with the resinous material and subjecting the same to a deep drawing operation.

Furthermore, resinous fibrous products have heretofore been fabricated wherein fibrous material was impregnated with a resinous binder but my invention relates to the fabrication of a resinous fibrous product possessing the characteristics first hereinabove set forth as distinguished from those resinous fibrous structures heretofore made.

An important feature of my invention resides in the provision of a material particularly adapted for deep drawing and in the formation of an improved deep drawn resinous product and to improvements in its fabrication.

Other objects, advantages and meritorious features of my invention will more fully appear from the following description, appended claims, and accompanying drawing, wherein:

Figure 1 is a perspective view of a blank of fiber material before being shaped under pressure and temperature, Fig. 2 is a view showing the preliminary steps of treating the blank in Fig. 1 between die members and the manner in which the cut away edges of the blank abut one another, and Fig. 3 is a side view of a completed cured article found in the dies of Fig. 2.

My improved fibrous resinous moldable or molded structure comprises fibrous filler material which may constitute up to 60% to 85% by weight of the total weight of the completed structure, the balance being a resinous binder. A suitable proportion based upon proportions in the completely cured structure is approximately 75% fibrous material and approximately 25% resinous material. Various synthetic resinous compounds may be utilized. Presumably the resins are fast curing, thermo-setting, resins. Certain urea formaldehyde and phenol formaldehyde resins have been found suitable for use.

A zinc chloride urea formaldehyde resin in aqueous solution sold commercially under the trade name of Lauxite has been used satisfactorily. A phenol formaldehyde resin sold commercially under the trade name of Catabond and in alcohol solution and using a 50% phosphoric acid solution as an accelerator has also been used satisfactorily.

The structural filler material should possess certain definite physical characteristics. The fibers which make up the material in sheet form should be relatively loosely integrated with each other and should not be matter closely together but merely loosely interlocked in order that the impregnated binder may thoroughly impregnate the sheet and be uniformly distributed throughout the sheet and uniformly weigh the fibers which make up the sheet.

The fibers should be long, strong and flexible to facilitate the drawing and forming operation and insure strength of drawn structure. On the other hand the fibers should be sufficiently stiff so that when opposed edge portions of a sheet are urged together the fibers of one edge portion will project into overlapped relation with respect to the fibers of the opposed edge portion rather than such edge portions overlapping each other and such fibers will slide easily into such overlapped relationship. The loosely integrated character of the sheet facilitates this result.

The fibers should be relatively non-absorbent in order that they will not individually absorb the resinous binder and become individually impregnated therewith as this would tend to render them brittle, reducing their flexibility and impairing their deep drawing ability.

A fibrous material which has been found suitable is a sisal sheet formed of loosely interlocked sisal fibers. These fibers are tough and strong. The fibers are relatively long and loosely integrated together in the sheet. The fibers are individually relatively non-absorbent. The fibers are flexible yet possess sufficient stiffness to accomplish the end above set forth. A sheet of material formed of similarly loosely integrated cactus fibers has also been found suitable.

A sheet of such material is immersed in a solution of resinous compound such as one of those above set forth. For example, such sheet may be immersed in a 70% to 80% aqueous solution of zinc chloride urea formaldehyde resin containing a very small percentage, for example, 2% of an oil plasticizer, such as di-ethylene glycol, until it is very thoroughly impregnated. Because of the exceedingly loosely integrated character of the fibers which make up the sheet, such impregnation is relatively thorough, but because of the relatively non-absorbent character of the individual fibers they do not individually absorb an appreciable amount of binder. After such immersion the sheet is squeezed to remove the excess of binder resin and air dried, such as by air currents, to reduce the volatile content of the reaction product to that desirable for the molding operation. As a small amount of moisture is known to assist the flow of resin in the die forming operation acting as a plasticizer, it is not desirable to completely remove all the moisture from the treated sheet. If the material were entirely dehydrated and then left in a humid atmosphere its hygroscopic water content would normally be sufficient for the purpose of assisting in this drawing operation.

The material is now ready for the die or stamping operation in the die. It is impregnated with the resinous binder and the sisal fibers are so loosely interlocked as to be free to slide with respect to each other without breakage or rupture of the sheet during the deep draw. The sheet is placed in the die and subjected to the molding operation between dies at pressures varying from 1000 lbs. to 2000 lbs. per square inch and temperatures which may vary from 300° F. to 350° F. The molding operation is very rapid, not requiring more than 15 seconds to mold the sheet to the desired shape and cure the resin. The fibers slide with respect to each other whereby the sheet will take the desired shape and the resinous binder cures about and between the several fibers welding them together. The fibrous sheet may be compacted from an original thickness of ½ inch from a sisal sheet of 3½ ounces per square foot to a thickness of .047 to .050 inch, the fibers being closely compacted and the resinous binder cured therebetween. The resin is thermo-setting and cures hard; and the cured structure is tough, strong, flexible, of light weight and moisture resistant. It is dielectric. It may be used for many purposes.

In the drawing there is shown a structure designed as a cover or housing for a compressor. It is formed from a single sheet deep drawn as shown. The blank may be shaped as shown in Fig. 1. Such blank, indicated as 10, is cut away as at 12 so that when forced into the die the opposite edges of the several segments will be wedged together with the fibers of one edge portion sliding into overlapped relationship with the fibers of the opposed edge portion as shown in Fig. 2 but the two edge portions will not overlap one another. In Fig. 2 there is shown how the blank of Fig. 1 would wedge the opposite edges 12 of the segments together but without definite overlapping of such segments if it were attempted to bring the same to the shape it would assume in the die. In Fig. 3 the completely cured structure indicated as 14 is shown.

The sisal fibers are tough, stiff and strong and as the edges are butt wedged together certain of the fibers of one edge portion are urged into the spaces between certain fibers of the opposed edge portion and if the sheet is further compacted the resin seals and welds these fibers together to form an integral structure of uniform character throughout. This is particularly important in obtaining satisfactory cure of the resin throughout the entire molded shape as well as in obtaining a homogeneous uniform structure. To obtain a uniform cure it is necessary that the sheet be subjected throughout to a predetermined combined pressure and temperature. A pressure curve in pounds per square inch and caliper in inches thereof of the reaction of a sheet in the forming die, for example a 3½ ounce sisal sheet ½ inch in thickness prepared, die formed and cured as described herein would show approximately that the ½ inch original thickness had been reduced to .100 with the first 50 lbs. pressure; 100 lbs. pressure would bring the caliper down to .084; 300 lbs. pressure would give a caliper of .059; 700 lbs. would give a caliper of .049; 1,000 lbs. would give a caliper of .047; and 2,000 lbs. would give a caliper of .046.

700 lbs. pressure per square inch under temperatures as set forth would, for some uses, prove satisfactory. 1000 to 2000 lbs. pressure would produce a particularly strong, stiff, sheet structure of uniform homogeneous character throughout. The resin binder would be uniformly cured throughout. The sheet would not have a spongy interior but would possess substantially uniform density throughout.

If, instead of certain of the stiff sisal fibers of one edge portion being projected into the spaces between the sisal fibers of the opposite edge portion resulting in the fusing together of such edges, these edge portions were overlapped and as would result if the structural material were composed of soft pliable fibers or closely integrated fibers so as to have a double thickness at such point, it would result that with 1000 lbs. pressure at such overlapped edge portions in the die, the remainder of the structure in the die would be subjected to a pressure of but a fraction of 1000 lbs. per square inch and such other portions of the sheet which were not overlapped would not receive the required pressure and temperature to effect a satisfactory cure and the resulting sheet would not possess a uniform density or homogeneous character throughout. A homogeneous uniform cure is therefore obtained throughout the entire structure with this method of fabrication whereas otherwise it would not be the result.

A structure so formed will present the desirable characteristics to a high and satisfactory degree if, in the completely cured shape, there is present approximately 74% sisal fibers and 26% resinous binder and satisfactory results may be obtained within the ranges heretofore set forth. Though the structure is highly compacted as evidenced from the pressure and caliper curve hereinabove discussed, it is of course obvious that the resinous reaction product forms only a part of the complete structure and its continuous character is interrupted and divided by the sisal fibers whereby it possesses a greater flexibility more to be compared to that of a plurality of separate films or layers of resinous material as distinguished from a single resinous sheet of equal thickness with such plurality of layers.

What I claim:

1. That process of fabricating a fibrous resin sheet structure comprising impregnating a fiber sheet consisting of relatively long, strong, tough, flexible and yet relatively stiff and individually relatively non-absorbent sisal fibers loosely interlocked together within the sheet, with a fast curing resin selected from a group of resins consisting of an aqueous solution of a zinc chloride urea formaldehyde resin and an alcohol solution of a phenol formaldehyde resin, urging one edge portion of said sheet into abutting relationship with another edge portion wedging them together and projecting the fibers of each edge portion into the abutting edge portion and btewen the fibers of said abutting edge portion into overlapping interfelted relationship, compacting said sheet in thickness and subjecting the same to sufficient heat to cure the resin.

2. That process of fabricating a fibrous resin sheet structure comprising impregnating a fiber sheet consisting of relatively long, strong, tough, flexible and yet relatively stiff fibers loosely interlocked together within the sheet, such fibers being individually relatively non-absorbent, with a fast curing thermo-setting resin selected from a group of resins consisting of an aqueous solution of a zinc chloride urea formaldehyde resin and an alcohol solution of a phenol formaldehyde resin, removing portions from said sheet forming opposite edges, shaping said sheet to bring said opposed edges into abutting relationship, wedging them together, urging certain of said fibers from each edge portion into interfelted relationship with the fibers of the abutting edge portion and simultaneously compacting said sheet in thickness under a pressure of from 1000 to 2000 lbs. per square inch and at a temperature equalling at least 300° F. to cure the resin.

JOHN P. NIELSEN.